July 3, 1962
J. C. DAWSON ET AL
3,041,684
FUMIGATION OF GRAIN
Filed July 6, 1959
3 Sheets-Sheet 1
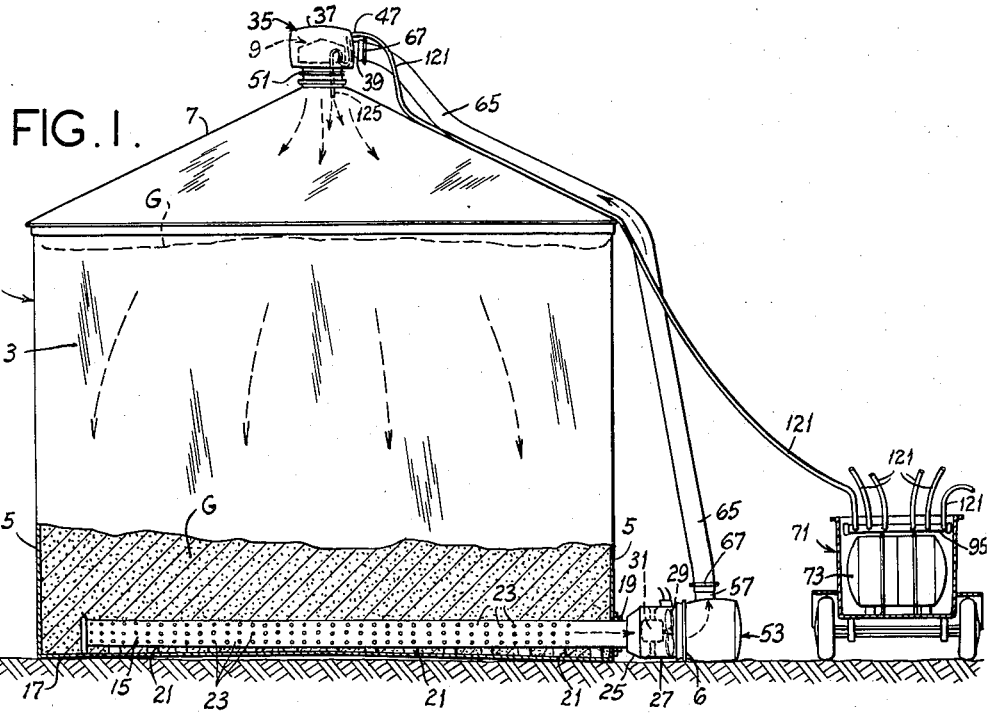
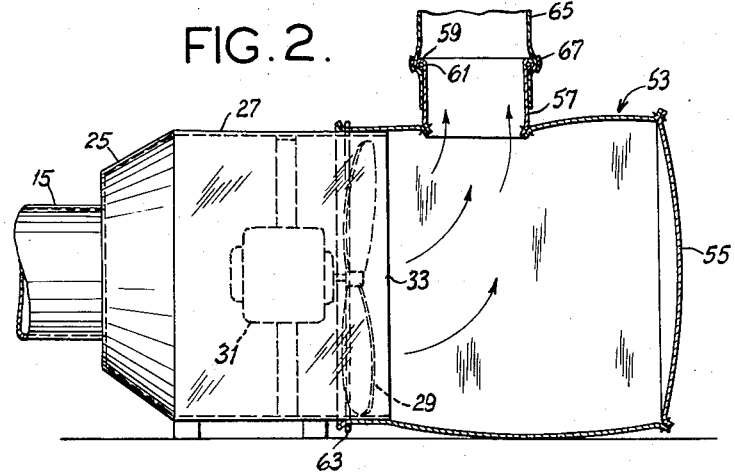
Joseph Carl Dawson,
Raymond P. Millard,
Inventors.
Koenig and Pope,
Attorneys.

Joseph Carl Dawson,
Raymond P. Millard,
Inventors.
Koenig and Pope,
Attorneys.

July 3, 1962
J. C. DAWSON ET AL
3,041,684
FUMIGATION OF GRAIN
Filed July 6, 1959
3 Sheets-Sheet 3
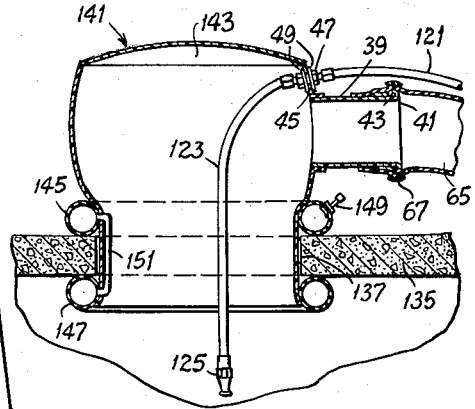
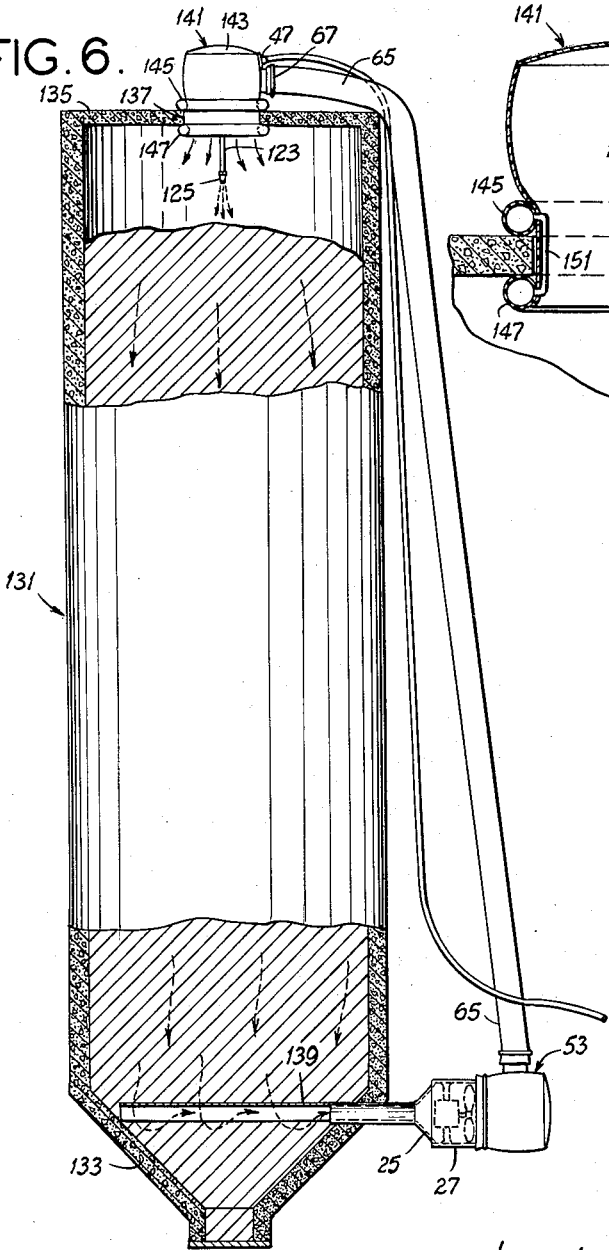
Joseph Carl Dawson,
Raymond P. Millard,
Inventors.
Koenig and Pope,
Attorneys.

United States Patent Office 3,041,684
Patented July 3, 1962

3,041,684
FUMIGATION OF GRAIN
Joseph Carl Dawson and Raymond P. Millard, Ferguson, Mo., assignors to Ferguson Fumigants, Inc., Ferguson, Mo., a corporation of Missouri
Filed July 6, 1959, Ser. No. 825,168
9 Claims. (Cl. 21—121)

This invention relates to the fumigation of grain (such as wheat, corn, oats, rye, barley and rice), and more particularly to apparatus for fumigating grain in storage in a grain storage structure.

Grain is frequently stored in bulk in a grain storage building, this type of storage being referred to as "flat storage." Such buildings frequently have one or more roof ventilators and one or more perforated air ducts extending along the floor of the building and through a wall of the building to a connection with the inlet end of a fan housing located outside the building, the exhaust or outlet end of the fan housing being open to the atmosphere. The grain is piled up in bulk in the building over the air duct, the duct being adapted for entry of air through its perforations without entry of grain to avoid clogging. With the fan in operation to exhaust air from the duct, air is drawn into the building through the roof ventilator (or ventilators), flows down through the grain, enters the duct through the perforations in the duct, and is exhausted back to the outside by the fan through the fan outlet. This arrangement is used for cooling the grain and to control moisture migration in the grain.

A similar arrangement may be used in conjunction with silo storage, the silo having an air duct extending transversely across the bottom thereof (usually across a hopper at the bottom of the silo). This duct may be a perforated duct, or it may be open along the bottom and closed at the top. Also, the silo has a manhole or filling opening at the top, which may be opened for ventilation, then serving essentially the same purpose as the roof ventilator of the above described storage building.

Among the several objects of this invention may be noted the provision of apparatus utilizing the duct and fan such as have heretofore been used for cooling for the additional purpose of fumigating the grain, fumigation being accomplished by recirculating air containing vaporized fumigant through the grain for as long a time as required to effect even distribution of the fumigant throughout the grain thereby to insure killing of insects throughout the grain; the provision of apparatus such as described which enables arrangements to be quickly and economically made for utilizing a roof opening (such as the roof ventilator in the case of a storage building or the manhole in the case of a silo) and the duct and fan for recirculating air through the grain and for introducing fumigant into the recirculating air for most effective fumigation; the provision of apparatus such as described which enables the use of portable equipment adapted to be readily transported from building to building or silo to silo, including means for providing recirculating ductwork adapted to be compactly packed and transported from place-to-place and to be re-used many times, and including a portable bulk liquid fumigant supply; and the provision of apparatus such as described which is safe to use (noting the toxicity of the fumigant) and which fills a need for economically and effectively fumigating grain in storage in grain storage buildings and silos of the class described. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in elevation with parts broken away and shown in section of a grain storage building installation of this invention;

FIG. 2 is an enlargement of a portion of FIG. 1 with parts broken away and shown in section;

FIG. 6 is a vertical section of a silo illustrating the invention as applied thereto; and, FIG. 7 is an enlarged fragment of FIG. 6 with parts further broken away and shown in section.

Corresponding reference characters indicate corresponding parts throughout the several views of the drawings.

Figure 5:
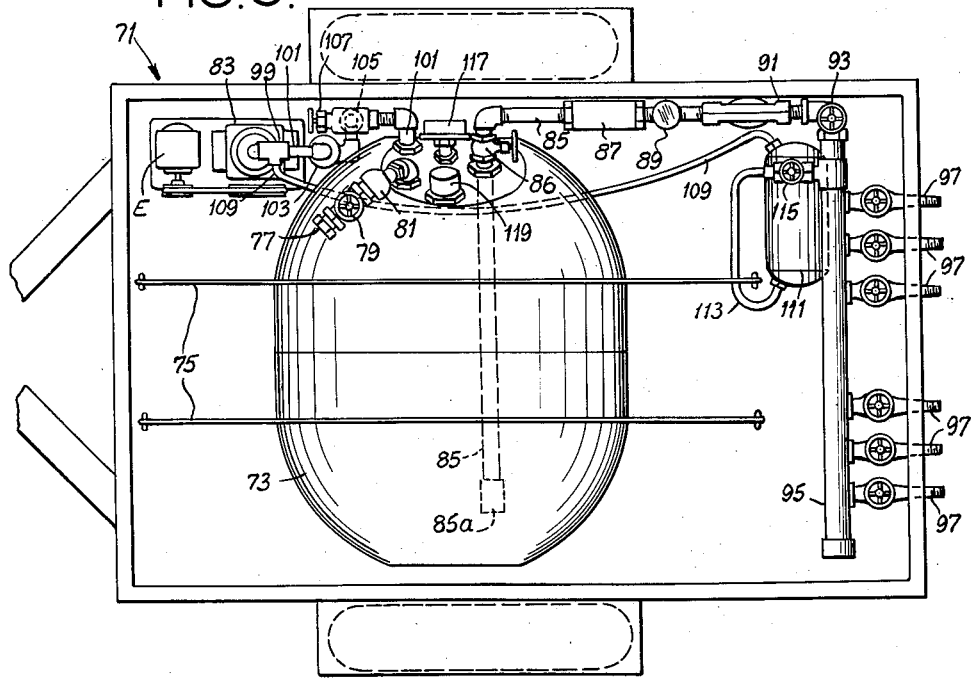
FIG. 5 is a plan of fumigant supply vehicle used in carrying out the invention.

Referring to FIG. 1 of the drawings, there is indicated at 1 a grain storage building of the class above described having end walls such as indicated at 3, side walls such as indicated at 5, and a gable roof 7. A conventional roof ventilator 9 (see FIGS. 1 and 3) of the type comprising a ventilator stack 11 and a weather cap 13 for the stack is shown on the roof ridge. Only one such ventilator appears in FIG. 1, but it will be understood that there may be several ventilators spaced along the roof ridge. A perforated air duct 15 is shown extending just above the floor 17 of the building from near one side of the wall through a collar 19 around an opening in the other side of the building. Supports for the duct are indicated at 21. The perforations in the duct are indicated at 23. These are either too small for passage of grain, or screening may be provided to prevent clogging by grain.

The outer end of the duct (which, outside the building, is imperforate) is connected to the inlet end 25 of a fan housing 27 which is mounted on the ground outside the building. The fan blade is indicated at 29 and the motor for driving the blade at 31. The blade is ordinarily adapted to discharge air through the exhaust or outlet end 33 of the fan housing, thereby inducing a flow of air down through the roof ventilator into the building above grain G piled up in the building over the duct 15, thence down through the grain, thence into the duct, and through the duct to the inlet end 25 of the fan housing.

It will be understood that the roof will usually have one or more filling openings (with covers therefor) for delivery of grain into the building to pile up on the floor 17 over the duct 15. While the duct 15 is shown as extending from side-to-side of the building, it may extend from end-to-end. There may be several such ducts and fans. For simplification of the disclosure herein, the invention will be described as it pertains to a building having only one roof ventilator and one air duct and fan.

Figure 3:
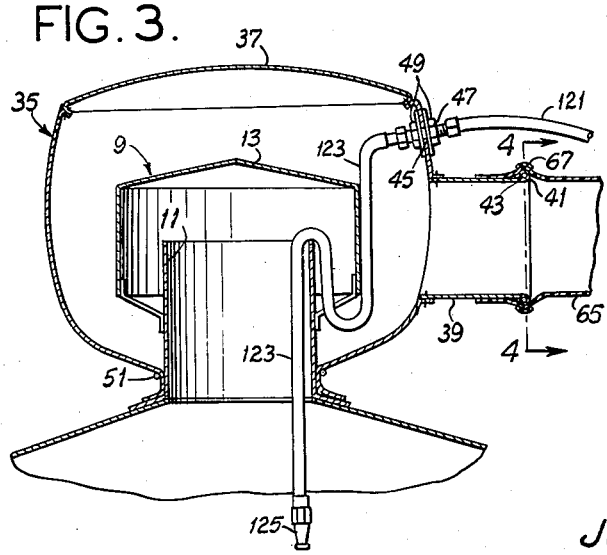
FIG. 3 is an enlargement of another portion of FIG. 1 with parts broken away and shown in section.

As shown in FIGS. 1 and 3, in accordance with this invention, an air-tight ventilator cover or bonnet 35 is applied to the roof ventilator 9 over the weather cap 13 thereof. This cover or bonnet 35 is constituted by what amounts to an inflatable bag made of any suitable fabric that has been treated to make it air-impervious, which may be of cylindrical form, having a circular closure 37 at one end, and being open at the other end. It will be understood that the bonnet need not be cylindrical, other shapes may be used if desirable, better to fit a ventilator.

Additionally, the bonnet has a laterally extending tubular connector arm 39 spaced from its closed end 37. Incorporated in this tubular arm 39, as by being retained in a hem 41 on the arm, is a substantially rigid clamping ring 43. Between the arm 39 and the closed end 37 of the bonnet, the cylindrical wall of the bonnet has a hole 45. A fumigant hose connector fitting 47 extends through this hole, being held in place as by nuts 49 threaded thereon against the inside and outside of the bonnet wall. The diameter of the bonnet when inflated is greater than the diameter of the weather cap of the roof ventilator (see FIG. 3). As applied to the roof ventilator, the open lower end of the bonnet is gathered around the ventilator stack 11 below the cap 13, and secured tightly around the stack by suitable means which may consist simply of a rope 51 tied tightly around the gathered lower end of the bonnet. This provides a reasonably air-tight seal between the lower end of the bonnet and the stack. Tubular arm 39 is made of the same material as bonnet 35.

As shown in FIGS. 1 and 2, an air-tight plenum chamber 53 is applied to the outlet end 33 of the fan housing 27. This plenum chamber, similarly to the bonnet 35, is constituted by what amounts to an inflatable bag made of any suitable fabric that has been treated to make it air-impervious. As herein illustrated, this plenum chamber is of square cross section, to fit a square fan housing outlet, being dimensioned to fit over the outlet. It is open at one end to fit over the outlet, and has a square closure 55 at its other (outer) end. Extending upward from the top wall of the plenum chamber is a tubular connector arm 57. Incorporated in this arm, as by being retained in a hem 59 on the arm, is a substantially rigid clamping ring 61 (like ring 43). As applied to the outlet end 33 of fan housing 27, the open end of the inflatable plenum chamber is secured tightly to the housing by suitable means, which may consist simply of a rope 63 tied tightly around the end of the plenum chamber. This provides a reasonably air-tight seal between the inner end of the plenum chamber and the fan housing. It will be understood that the plenum chamber need not be of square cross section; it may be made of other shapes to fit different fans.

Figure 4:
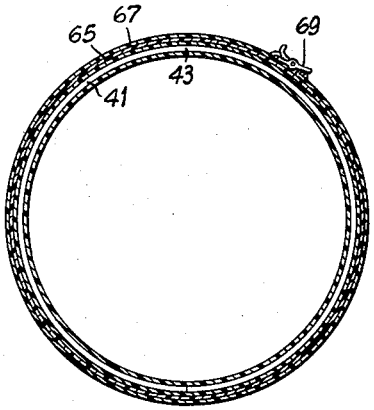
FIG. 4 is an enlarged section taken on line 4—4 of FIG. 3.

A length of air-tight flexible inflatable tubing 65 is connected between the arm 57 of the plenum chamber 53 and the arm 39 of the bonnet 35. This tubing may consist of conventional commercially available polyethylene tubing, for example, of such size as to fit over the arms 57 and 39. A suitable length of the tubing to extend from arm 57 to arm 39 for any given installation may be unwound from a supply roll of the tubing and cut off. The ends of the length of tubing are applied over the arms 57 and 39, and over the clamping rings 61 and 43 of these arms, and clamped in air-tight manner thereon as by means of clamping straps 67 of arcuate cross section (see FIG. 4) which are clamped around the rings. Each of the clamping straps may consist, for example, of a length of longitudinally split flexible pastic tubing provided with means such as indicated at 69 at its ends for drawing it tight around the ring.

The above-described arrangement is such as to provide a closed circuit for recirculation of air through the grain G in building 1, this circuit being as follows: from plenum chamber 53 through plenum chamber arm 57, tubing 65, bonnet arm 39, bonnet 35, roof ventilator stack 11, thence down through the grain G, into the duct 15, through the duct back to the fan housing, and thence into the plenum chamber. With the fan in operation, the plenum chamber 53, the tubing 65 and the bonnet 35 are inflated by reason of the air pressure caused by the fan so as to be open for flow of air therethrough.

Referring to FIGS. 1 and 5 of the drawings, there is indicated at 71 a vehicle trailer carrying a pressure vessel 73 which contains a supply of liquid fumigant, more particularly an ethylene dibromide—methyl bromide fumigant such as disclosed in Dawson U.S. Patent 2,606,857. The vessel is strapped down on the bed of the trailer as by cables 75. A filling inlet for filling the vessel with fumigant is indicated at 77. This filling inlet includes a cut-off valve 79 and a check valve 81 adapted to close outwardly to prevent escape of fumigant from the vessel in case the filling line through which fumigant is delivered to the vessel is disconnected without closing the cut-off valve 79. Compressed air is supplied to the vessel as from an air compressor 83 mounted on the bed of the trailer for forcing fumigant from the vessel through a delivery line 85. At the inner end of line 85 within the vessel 83 there is an excess flow valve 85a. Outside vessel 73, line 85 includes a cut-off valve 86, a filter 87 (such as a glass wool filter) for filtering the fumigant, a hydrostatic relief standpipe 89 (which appears in plan in FIG. 5), and a meter 91 for measuring the flow of fumigant. Excess flow valve 85a is of a known type adapted to cut off flow of fumigant from the vessel if valve 86 should break off in an accident. Line 85 is connected to the inlet of a cut-off valve 93. A header 95 is connected to the outlet of valve 93. Connected to the header are a plurality of cocks 97, each adapted for connection of a hose thereto. Six such cocks are shown. The compressor 83 delivers air to a T 99, from which there is an air line 101 to the vessel 73 including a dryer 103, a check valve 105 and a cut-off valve 107, also an air line 109 to an auxiliary blow-off air tank 111. An air line 113 including a cut-off valve 115 connects tank 111 to the header 95. A pressure gauge 117 is provided for indicating the air pressure in the vessel, and a safety valve 119 is provided for relieving excess pressure in the vessel. The compressor is driven by an electric motor E, which may be powered from the vehicle hauling the trailer, or from the source of power for the fan on the job. It will be understood that vessel 73 and its appurtenances may be mounted on a truck instead of a trailer.

As shown in FIGS. 1 and 3, a fumigant delivery hose 121, such as a plastic hose, is connected between one of the cocks 97 and the outer end of the hose connector fitting 47 of the bonnet 35. Another hose 123, such as a plastic hose, is connected to the inner end of connector fitting 47 and is inserted in the ventilator stack 11, hanging down in the stack. At the lower end of hose 123 is a nozzle 125. This is preferably of a type having interchangeable orifices whereby its rate of discharge may be changed.

Operation is as follows:

The amount of fumigant required for fumigation on the particular job is determined. This is dependent on such factors as the cubic footage of the building, the average temperature of the grain, and the leakage to be expected from the building. With the fan 29 in operation, manometer readings are taken to determine the rate of flow of air through different regions of the grain mass. This rate may vary considerably from region to region. From the manometer readings, a determination is made of the time required for a single pass of air through the region of least resistance to flow of air down through the grain and the time required for a single pass of air through the region of highest resistance. Then, an orifice is selected for nozzle 125 such as will deliver the required dosage in a length of time approximating the time required for a single pass of air through the region of least resistance. Assuming, for example, that it takes five minutes for a single pass of air through the region of least resistance, an orifice is used in nozzle 125 that will deliver the required dosage in about five minutes (for the particular predetermined air pressure supplied to the vessel 73 by the air compressor 83, which may be sufficient to provide a pressure of 100 p.s.i., for example, at the nozzle 125, and which is maintained constant throughout the delivery of the fumigant).

The fan 29 is operated to cause circulation of air through the grain G in building 1 as above described. With predetermined air pressure in the vessel 73, the header valve 93 and the cock 97 for the hose leading up to the bonnet 35 are opened. The remaining cocks 97 are left closed. Air valve 115 is closed. Fumigant is thereby delivered from the vessel 73 through hoses 121 and 123 and sprays out of nozzle 125 into the air above the grain G at the proper rate for delivery of the required dosage in the length of time required for a single pass of air through the region of least resistance to flow of air. The fumigant disperses in the air and is carried down with the air through the grain. When the predetermined dosage of fumigant has been delivered from the vessel 73, as determined by observation of the meter 91, the header valve 93 is closed to cut off the flow. Then, the air valve 115 is opened for delivery of air from auxiliary tank 111 to the header 95 to blow off the header and hose lines 121 and 123 to clear them of fumigant and to provide for full delivery of the measured amount of fumigant into the building. After the header 95 and hose lines 121 and 123 have been cleared, the air valve 115 is closed. The fan 29 is maintained in operation to provide for recirculation of the air containing the vaporized fumigant through the grain for as long a time as required to accomplish substantially even distribution of fumigant throughout the mass of the grain to effect a complete kill of insects which may be infesting the grain. This will be at least the time required for a single pass of air through the region of highest resistance to flow of air, and ordinarily, for thoroughness, will be twice that time.

After fumigation as above described has been completed, the hose 121 is disconnected from the cock 97 and the bonnet connector 47 and coiled up, the plastic tubing 65 if disconnected from the bonnet and plenum chamber arms 39 and 57 by releasing the clamping straps 67, the bonnet 35 is removed from the ventilator 9 by untying the rope 51, and the plenum chamber 53 is removed from the fan housing by untying the rope 63. The bonnet 35 and plenum chamber 53 are collapsed and packed in compact manner and taken to the next job for re-use. Tubing 65 may be re-used on another job where its length is suitable. It will be understood that on the next job, the same setup as above described will be made. Spraying the fumigant into the air above the grain avoids action of the fumigant as a refrigerant such as would tend to condense and freeze moisture in the air on humid days.

In the case of a building having several roof ventilators, and one air duct and fan, only one of the roof ventilators will have a bonnet 35 applied thereto. The remaining roof ventilators will be blocked off as by applying polyethylene bags thereover, gathering the open lower ends of the bags around the ventilator stacks, and tying ropes around the gathered lower ends of the bags.

In some instances, it may be desirable to provide for delivery of air by a single fan to two or more roof ventilators. In such case, a special plenum chamber having a plurality of outlet arms such as the arm 57 may be used, plastic tubes 65 being connected between these arms and the arms 39 on bonnets 35 applied to the roof ventilators. Fumigant hose lines such as the line 121 may then be run from as many of the cocks 97 as there are bonnets 35 to the bonnets. Having a plurality of cocks 97 also enables simultaneous delivery of fumigant to a plurality of systems such as shown in FIG. 1. This is useful, for example, in regard to a building having a plurality of air ducts and fans and a corresponding plurality of roof ventilators.

Referring to FIG. 6 of the drawings, there is indicated at 131 a silo having a hopper bottom 133 and a top 135 provided with a hole 137 such as a manhole. Extending across the hopper is an air duct 139. The outer end of the duct outside the hopper is connected to the inlet end 25 of a fan housing 27, similarly to the above. Duct 139 may be a perforated duct or one having a slot along its bottom. A special bonnet 141, to be described, is applied to the top 135 of the silo at the manhole 137.

A plenum chamber 53, the same as above described, is applied to the outlet end 33 of the fan housing 27. A length of air-tight flexible inflatable tubing 65 is connected between the plenum chamber 53 and the bonnet 141.

Bonnet 141 comprises an inflatable bag, which may be of cylindrical form, having a closure 143 at the top and being open at the bottom. Adjacent its open end, two inflatable tubes 145 and 147 are secured to the outside thereof, these tubes being spaced heightwise of the bonnet. The upper tube 145 has a filling valve 149, and a tube 151 is provided on the inside of the bonnet connecting the two tubes 145 and 147 (see FIG. 7). The bonnet has a lateral arm 39, a fitting 47 for connection of fumigant delivery hose 121, a hose 123 and a nozzle 125 the same as bonnet 35 above described.

With tubes 145 and 147 deflated, the lower end of bonnet 141 is inserted in the manhole 137. Then tubes 145 and 147 are inflated (a hand pump may be used). When inflated, the lower tube 147 engages the bottom surface of silo top 135 around the hole 137 and the upper tube 145 engages the upper surface of silo top 135 around the hole 137 to provide a substantially air-tight seal between the lower end of the bonnet and the silo top. Fumigation is carried out with this installation in essentially the same manner as above described for the building 1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for fumigating grain in storage in a grain storage structure having an opening at the top and an air duct at the bottom extending to the outside of the structure, said duct being connected to a fan outside the structure adapted to cause movement of air vertically through the grain, comprising an air-tight bonnet of flexible sheet material releasably secured in place to the structure over said top opening with a substantially air-tight seal, said bonnet having a tubular arm projecting outward therefrom, an air-tight plenum chamber of flexible sheet material releasably secured to the fan with a substantially air-tight seal, said plenum chamber having a tubular arm projecting outward therefrom, a length of air-tight flexible plastic tubing connected between said arms, and means for introducing fumigant into the closed air circuit constituted by the structure, the duct, the fan, the plenum chamber, the tubing and the bonnet.

2. Apparatus for fumigating grain in storage in a grain storage structure having an opening at the top and an air duct at the bottom extending to the outside of the structure, said duct being connected to a fan outside the structure adapted to cause movement of air vertically through the grain, comprising an inflatable bonnet of flexible sheet material releasably secured in place to the structure over said top opening with a substantially air-tight seal, said bonnet having a tubular arm extending laterally outward therefrom, an inflatable plenum chamber of flexible sheet material releasably secured to the fan with a substantially air-tight seal, said plenum chamber having a tubular arm extending upward therefrom, a length of flexible inflatable tubing connected between said arms, and means for introducing fumigant into the closed circuit constituted by the structure, the duct, the fan, the plenum chamber, the tubing and the bonnet.

3. Apparatus for fumigating grain in storage in a grain storage structure having an opening at the top and an air duct at the bottom extending to the outside of the structure, said duct being connected to the inlet of a fan adapted to draw air down through the grain and into the duct and to exhaust the air through the fan outlet on the outside of the structure, comprising an inflatable bonnet of flexible sheet material releasably secured in place to the structure over said top opening with a substantially air-tight seal, said bonnet having a tubular arm extending laterally therefrom, an inflatable plenum chamber of flexible sheet material releasably secured to the fan outlet with a substantially air-tight seal, said plenum chamber having a tubular arm extending upward therefrom, a length of flexible inflatable tubing connected between said arms, and means for introducing fumigant into said structure above the grain therein.

4. Apparatus as set forth in claim 3 wherein the ends of the tubing surround the arms, each end of the tubing being clamped to the respective arm by clamping means comprising a ring associated with the arm and a clamping member surrounding tubing.

5. Apparatus as set forth in claim 3 wherein said means for introducing fumigant into said structure comprises a portable bulk liquid fumigant dispenser including a pressure vessel for containing liquid fumigant, a hose having a connection to said vessel, a valve in said connection, said hose being connected to a fitting on the bonnet, and a second hose extending from said fitting within the bonnet and through said top opening and having a nozzle at the end thereof.

6. A bonnet for use in a system for fumigating grain in storage in a grain storage structure which has a top opening, comprising a bag of air-impervious flexible sheet material having an open end adapted to fit said top opening, a tubular arm of air-impervious flexible sheet material extending outward from the bag, and a substantially rigid clamping ring associated with the arm, said arm being adapted to have one end of a length of flexible tubing applied thereover and clamped thereto by a clamping member cooperable with said ring.

7. A bonnet as set forth in claim 6 further having a hose connector extending through the wall thereof adapted for connection of hoses to its inner and outer ends.

8. A bonnet as set forth in claim 6 having a pair of spaced inflatable tubes on the outside thereof adjacent its said open end.

9. A plenum chamber for use in a system for fumigating grain in storage in a grain storage structure which has an air duct at the bottom extending to a fan outside the structure, comprising a bag of air-impervious flexible sheet material having an open end adapted to fit over the housing of the fan, a tubular arm of air-impervious flexible sheet material extending outward from the bag, and a substantially rigid clamping ring associated with the arm, said arm being adapted to have one end of a length of flexible tubing applied thereover and clamped thereto by a clamping member cooperable with said ring.

References Cited in the file of this patent
UNITED STATES PATENTS

| | | |
|---|---|---|
| 1,613,186 | Moffett | Jan. 4, 1927 |
| 2,000,103 | Shodron | May 7, 1935 |
| 2,131,134 | Baer | Sept. 27, 1938 |
| 2,157,975 | Wilson | May 9, 1939 |
| 2,250,943 | Arnold | July 29, 1941 |
| 2,286,888 | Arnold | June 16, 1942 |
| 2,293,931 | Cook | Aug. 25, 1942 |
| 2,443,866 | Moffett | June 22, 1948 |
| 2,929,154 | Finnegan | Mar. 22, 1960 |
| 2,955,523 | Rasch | Oct. 11, 1960 |